United States Patent
Seriy et al.

(10) Patent No.: US 11,023,427 B2
(45) Date of Patent: Jun. 1, 2021

(54) SYSTEM AND METHOD FOR REAL-TIME SYNCHRONIZATION OF SOURCE REPOSITORIES

(71) Applicant: HCL America Inc, Sunnyvale, CA (US)

(72) Inventors: Alex Seriy, Chelmsford, MA (US); Adrian Daniel Cruzat, Chelmsford, MA (US); Peter Kapitula Battinelli, Chelmsford, MA (US); Eric Chaland, Chelmsford, MA (US)

(73) Assignee: HCL America Inc., Sunnyvale, CA (US)

( * ) Notice: Subject to any disclaimer, the term of this patent is extended or adjusted under 35 U.S.C. 154(b) by 143 days.

(21) Appl. No.: 16/286,656

(22) Filed: Feb. 27, 2019

(65) Prior Publication Data

US 2020/0272607 A1  Aug. 27, 2020

(51) Int. Cl.
*G06F 16/18* (2019.01)
*G06F 16/178* (2019.01)
*G06F 16/93* (2019.01)
*G06F 16/182* (2019.01)

(52) U.S. Cl.
CPC ...... *G06F 16/1873* (2019.01); *G06F 16/1794* (2019.01); *G06F 16/1844* (2019.01); *G06F 16/93* (2019.01)

(58) Field of Classification Search
CPC .............. G06F 16/1794; G06F 16/1844; G06F 16/1873; G06F 16/258; G06F 16/84; G06F 3/1247

USPC ......................................................... 707/695
See application file for complete search history.

(56) References Cited

U.S. PATENT DOCUMENTS

| | | | |
|---|---|---|---|
| 6,446,075 B1 | 9/2002 | Velasco | |
| 9,652,225 B1 | 5/2017 | Bohn et al. | |
| 9,983,860 B1 | 5/2018 | Koty et al. | |
| 10,083,027 B2 | 9/2018 | Moorthi et al. | |
| 10,120,917 B2 | 11/2018 | Kothari et al. | |
| 2018/0107455 A1 | 4/2018 | Psistakis | |
| 2020/0201865 A1* | 6/2020 | Siebeking | G06F 16/84 |

FOREIGN PATENT DOCUMENTS

CN   105302716 A   2/2016

* cited by examiner

*Primary Examiner* — Hung T Vy
(74) *Attorney, Agent, or Firm* — HM Law Group LLP; Vani Moodley, Esq.

(57) ABSTRACT

The present disclosure relates to system(s) and method(s) for real-time synchronization of source repositories is illustrated. The system is configured to receive a set of documents corresponding to history of changes and changed data associated with a source repository since last replication of the source repository over an intermediate storage. Further, the system may convert the set of documents in an intermediate format to generate a set of intermediate documents. Further, the system may comprise steps to identify one or more target repositories from the set of repositories based on analysis of the set of intermediate documents and current status associated with each repository from set of repositories. Further, the system transmit the set of intermediate documents to the one or more target repositories.

9 Claims, 3 Drawing Sheets

SYSTEM AND METHOD FOR REAL-TIME SYNCHRONIZATION OF SOURCE REPOSITORIES

CROSS-REFERENCE TO RELATED APPLICATIONS AND PRIORITY

The present application does not claim priority from any patent application.

TECHNICAL FIELD

The present disclosure in general relates to the field of data synchronization. More particularly, the present invention relates to a system and method for real-time synchronization of source repositories.

BACKGROUND

In the field of software development, a number of source control repositories are used. Different software development teams may work on different source control repositories in order to develop a particular software. However, to keep synchronization among two or more different source control repositories, along with their histories is very difficult. EAI (SOA) and ETL have solutions for keeping different systems which use different formats synchronized in either real-time or batch. Both real-time data synchronization (SOA) and batch synchronization (ETL) systems are able to move data from various sources to various targets, even if they are of different formats. Both real-time data synchronization (SOA) and batch synchronization (ETL) may use intermediate formats and persistence. However, they always synchronize only the latest version of the source data. If the source data has changed many times since the last sync, those changes are not migrated to the target systems.

Tools such as SVN-to-Git (https://git-scm.com/docs/git-svn) in that SVN-to-Git does a 1-to-1 match, as both SVN and Git work via snapshots. Clearcase-Git Integration however uses an intermediate format to package the operation and perform the commits Systems such as Clearcase MultiSite synchronize histories between two instances of a source control system, but only if they are both instances of the same source control system.

SUMMARY

Before the present systems and method for real-time synchronization of source repositories is illustrated. It is to be understood that this application is not limited to the particular systems, and methodologies described, as there can be multiple possible embodiments that are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for real-time synchronization of source repositories. This summary is not intended to identify essential features of the claimed subject matter nor is it intended for use in determining or limiting the scope of the claimed subject matter.

In one implementation, a system for real-time synchronization of source repositories is illustrated. The system comprises a memory and a processor coupled to the memory, wherein the processor is configured execute programmed instructions stored in the memory to receive a set of documents corresponding to history of changes and changed data associated with a source repository since last replication of the source repository over an intermediate storage. In one embodiment, the source repository is selected from a set of repositories. Further, the processor is configured to execute programmed instructions stored in the memory to convert the set of documents in an intermediate format to generate a set of intermediate documents. The set of intermediate documents are stored in the intermediate storage, wherein the set of intermediate documents are compatible with the set of repositories. Further, the processor is configured to execute programmed instructions stored in the memory to identify one or more target repositories from the set of repositories based on analysis of the set of intermediate documents and current status associated with each repository from set of repositories. Further, the processor is configured to execute programmed instructions stored in the memory to transmit the set of intermediate documents to the one or more target repositories. In one embodiment each target repository is configured to convert the set of intermediate documents into a format compatible with the target repository and update the target repository based on the set of intermediate documents.

In one implementation, a method for real-time synchronization of source repositories is illustrated. The method may comprise steps to receive a set of documents corresponding to history of changes and changed data associated with a source repository since last replication of the source repository over an intermediate storage. In one embodiment, the source repository is selected from a set of repositories. Further, the method may comprise steps to convert the set of documents in an intermediate format to generate a set of intermediate documents. The set of intermediate documents are stored in the intermediate storage, wherein the set of intermediate documents are compatible with the set of repositories. Further, the method may comprise steps to identify one or more target repositories from the set of repositories based on analysis of the set of intermediate documents and current status associated with each repository from set of repositories. Further, the method may comprise steps to transmit the set of intermediate documents to the one or more target repositories. In one embodiment each target repository is configured to convert the set of intermediate documents into a format compatible with the target repository and update the target repository based on the set of intermediate documents.

In yet another implementation, a computer program product having embodied computer program for real-time synchronization of source repositories is disclosed. The program may comprise a program code to receive a set of documents corresponding to history of changes and changed data associated with a source repository since last replication of the source repository over an intermediate storage. In one embodiment, the source repository is selected from a set of repositories. Further, the program may comprise a program code to convert the set of documents in an intermediate format to generate a set of intermediate documents. The set of intermediate documents are stored in the intermediate storage, wherein the set of intermediate documents are compatible with the set of repositories. Further, the program may comprise a program code to identify one or more target repositories from the set of repositories based on analysis of the set of intermediate documents and current status associated with each repository from set of repositories. Further, the program may comprise a program code to transmit the set of intermediate documents to the one or more target repositories. In one embodiment each target repository is configured to convert the set of intermediate documents into a format compatible with the target repository and update the target repository based on the set of intermediate documents.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "converting", "transmitting", "identifying", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in real-time synchronization of source repositories, the exemplary, systems and method for pre-processing of the image is now described.

Various modifications to the embodiment will be readily apparent to those skilled in the art and the generic principles herein may be applied to other embodiments. However, one of ordinary skill in the art will readily recognize that the present disclosure for real-time synchronization of source repositories is not intended to be limited to the embodiments illustrated, but is to be accorded the widest scope consistent with the principles and features described herein.

Figure 1:
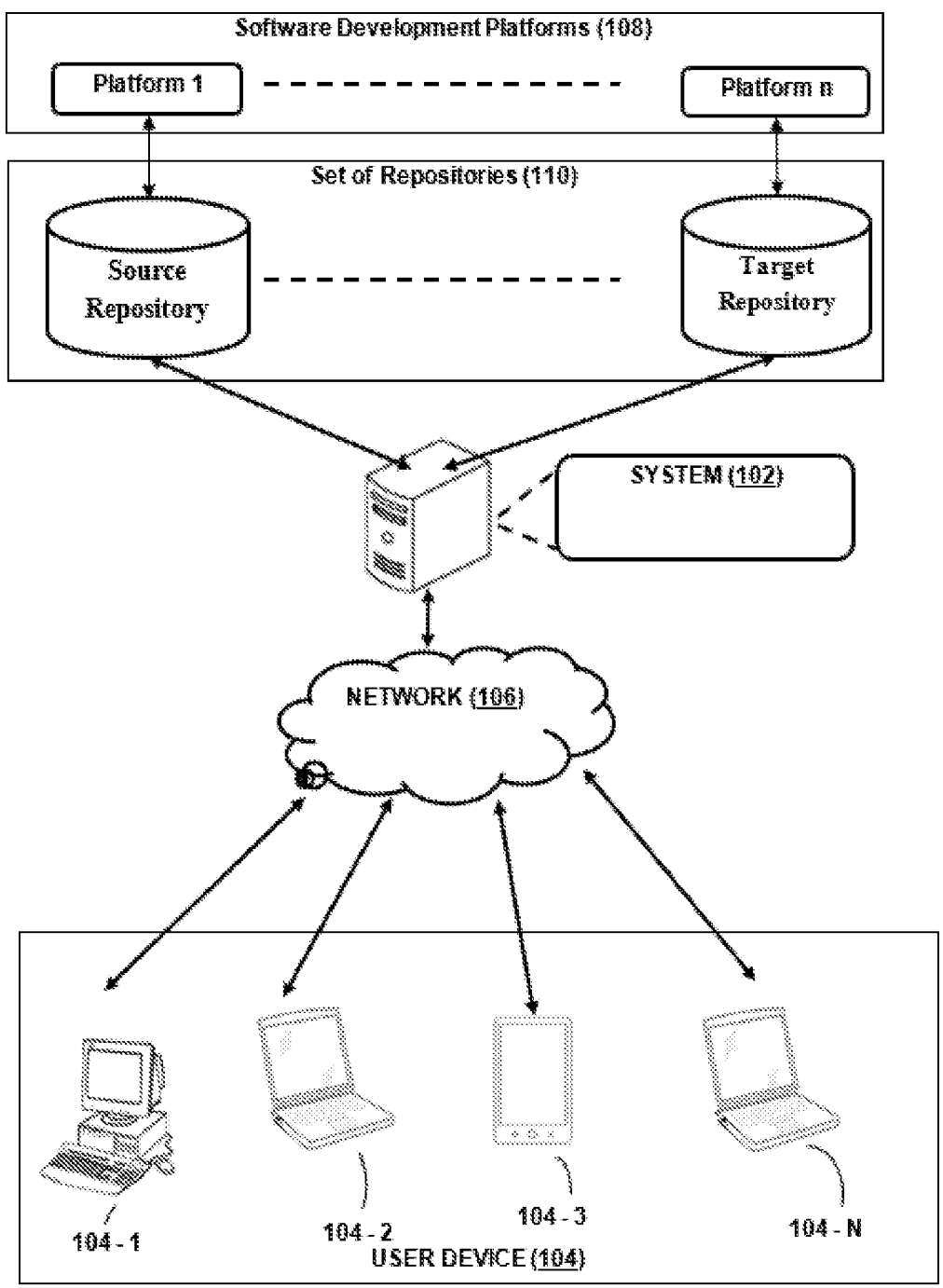
FIG. 1 illustrates a network implementation of a system configured for real-time synchronization of source repositories, in accordance with an embodiment of the present subject matter.

Further, the network implementation of system configured for real-time synchronization of source repositories is illustrated with FIG. 1.

Referring now to FIG. 1, a network implementation 100 of a system 102 for real-time synchronization of source repositories is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a server. Further, the system 102 may be implemented in a cloud network. In one embodiment, the system may be implemented as a Platform as a Service (Paas). The system 102 may further be configured to communicate with a set of repositories 110. Further, each repository from the set of repositories 110 may be configured to store a source code associated with a software under development.

Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), File Transfer Protocol(FTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like. In one embodiment, the system 102 may be configured to access the set of repositories 110. Further, any one of the repositories from the set of repositories 110 may be referred to as a source repository or a target repository. The source repository may be a repository at which the software under development is updated, whereas the target repository may be a repository, which is impacted due to the change at the source repository. In one embodiment, each repository from the set of repositories 110 is associated using the software development platforms 108. The user can use the user device 104 in order to access the software development platforms 108 and further the set of repositories 110. Some examples of the repositories may include clearcase™, gihub™, etc. Furthermore, the system 102 may be configured to continuously monitor the set of repositories 110 to detect an event corresponding to change in data of any repository. The operation of the system 102 once the event occurs is further described with respect to FIG. 2.

Figure 2:
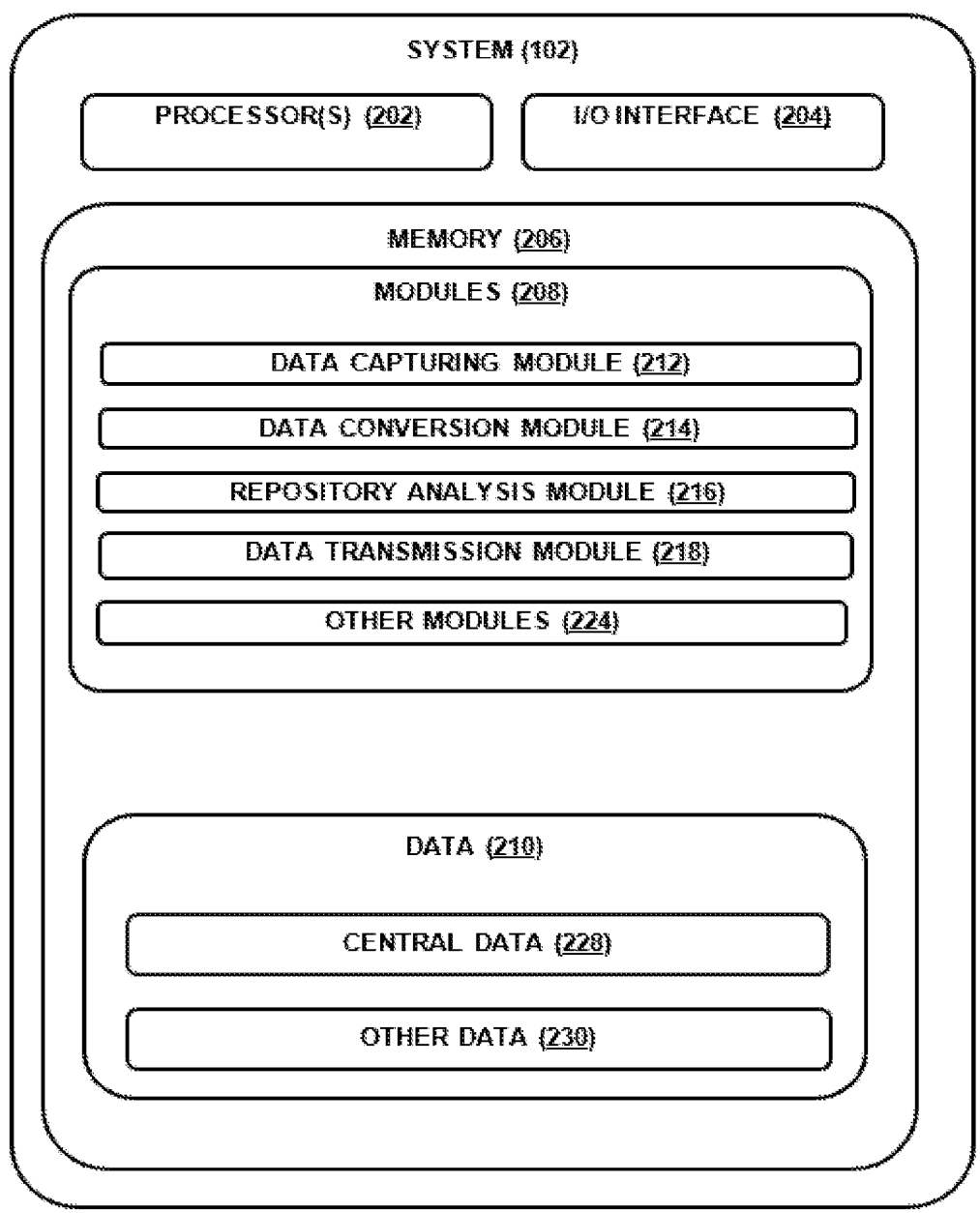
FIG. 2 illustrates the system configured for real-time synchronization of source repositories, in accordance with an embodiment of the present subject matter.

Referring now to FIG. 2, the system 102 is configured for real-time synchronization of source repositories in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the modules 208 may be configured to perform functions of the speech controller, visual face recognition & controller, and modulation & frame decomposer. The module 208 may include a data capturing module 212, a data conversion module 214, a repository analysis module 216, a data transmission module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a central data 228, and other data 230. In one embodiment, the other data 230 may include data generated as a result of the execution of one or more modules in the other modules 224. In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102. The functioning of all the modules in the system 102 is described as below:

Data Capturing Module 212

In one embodiment, each repository, from the set of repositories 110, is configured to maintain source code corresponding to a software under development. The set of repositories 110 are accessible through the software development platforms 112. Each of the software development platforms enables the users to change the data stored in a repository. Further, the data capturing module 212 may be configured for receiving a set of documents from a repository. The set of documents may correspond to history of changes and changed data associated with a repository since last replication of the source repository over an intermediate storage. The intermediate storage is a central repository connected to all the other repositories from the set of repositories 110. In one embodiment, the data capturing module 212 may be configured to monitor each repository from the set of repositories 110 and identify any change in at least one repository from the set of repositories 110. The repository with identified change may be considered as the source repository. In one embodiment, the history of changes correspond to timelines associated with one or more changes in the source repository.

Data Conversion Module 214

In one embodiment, the data conversion module 214 is configured for converting the set of documents in an intermediate format to generate a set of intermediate documents. The set of intermediate documents are compatible with each repository from the set of repositories 110. Further, the set of intermediate documents are stored in the intermediate storage. In a similar manner, changes introduced by software developers or other stakeholders in the software development cycle may be captured and stored in the intermediate storage. The intermediate storage may act as a central place for storing all the changes made by different stakeholders in the software development lifecycle.

Repository Analysis Module 216

In one embodiment, the repository analysis module 216 is configured for identifying one or more target repositories from the set of repositories 110 based on analysis of the set of intermediate documents and current status associated with each repository from set of repositories. For example, the one or more target repositories may correspond to repositories that are impacted by the change in the source repository. If there is no impact on a particular repository, then this repository is not considered as target repository. For example, a change in the graphical user interface may not affect a repository storing database information of the software under development. The repository analysis module 216 identifies only these repositories as target repositories which are impacted by the change. This allows the system 102 to save time and cost in updating of entire set of repositories.

Data Transmission Module 218

In one embodiment, the data transmission module 218 is configured for transmitting the set of intermediate documents to the one or more target repositories. In one embodiment, each target repository is configured to convert the set of intermediate documents into a format compatible with the target repository. Further, the set of intermediate documents are used to update the target repository in real-time based on the set of intermediate documents. The set of intermediate documents not only enables updating the data but also the historical changes taking place at different repositories. This enables a developer to go through the history of changes and accordingly take correct decision in the software development cycle further avoiding unnecessary rework.

Figure 3:
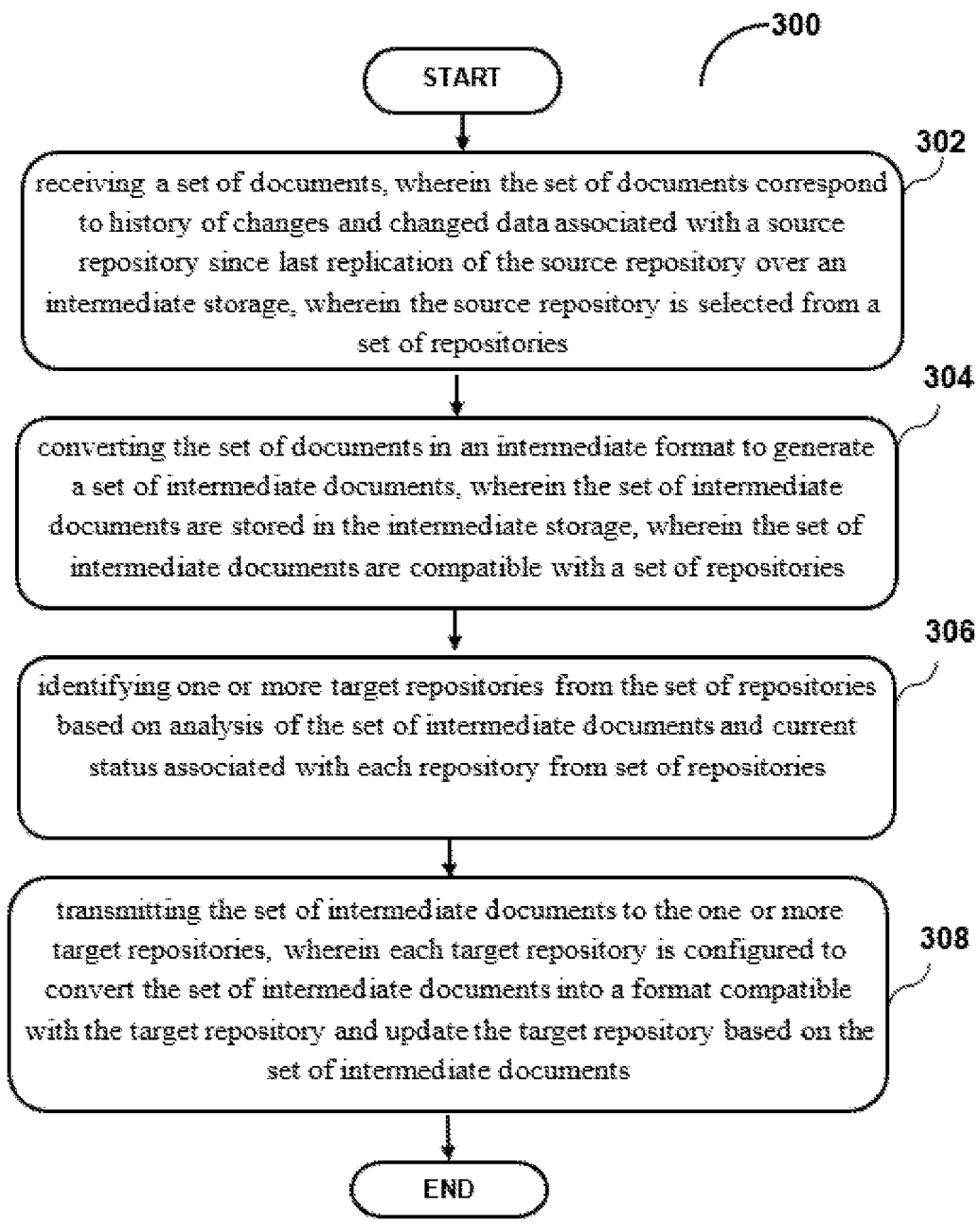
FIG. 3 illustrates a method for real-time synchronization of source repositories, in accordance with an embodiment of the present subject matter.

Referring now to FIG. 3, a method 300 for real-time synchronization of source repositories, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the data capturing module 212 may be configured for receiving a set of documents from a repository. The set of documents may correspond to history of changes and changed data associated with a repository since last replication of the source repository over an intermediate storage. The intermediate storage is a central repository connected to all the other repositories from the set of repositories 110. In one embodiment, the data capturing module 212 may be configured to monitor each repository from the set of repositories 110 and identify any change in at least one repository from the set of repositories 110. The repository with identified change may be considered as the source repository. In one embodiment, the history of changes correspond to timelines associated with one or more changes in the source repository.

At block 304, the data conversion module 214 is configured for converting the set of documents in an intermediate format to generate a set of intermediate documents. The set of intermediate documents are compatible with each repository from the set of repositories 110. Further, the set of intermediate documents are stored in the intermediate storage. In a similar manner, changes introduced by software developers or other stakeholders in the software development cycle may be captured and stored in the intermediate storage. The intermediate storage may act as a central place for storing all the changes made by different stakeholders in the software development lifecycle.

At block 306, the repository analysis module 216 is configured for identifying one or more target repositories from the set of repositories 110 based on analysis of the set of intermediate documents and current status associated with each repository from set of repositories. For example, the one or more target repositories may correspond to repositories that are impacted by the change in the source repository. If there is no impact on a particular repository, then this repository is not considered as target repository. For example, a change in the graphical user interface may not affect a repository storing database information of the software under development. The repository analysis module 216 identifies only these repositories as target repositories which are impacted by the change. This allows the system 102 to save time and cost in updating of entire set of repositories.

At block 308, the data transmission module 218 is configured for transmitting the set of intermediate documents to the one or more target repositories. In one embodiment, each target repository is configured to convert the set of intermediate documents into a format compatible with the target repository. Further, the set of intermediate documents are used to update the target repository in real-time based on the set of intermediate documents. The set of intermediate documents not only enables updating the data but also the historical changes taking place at different repositories. This enables a developer to go through the history of changes and accordingly take correct decision in the software development cycle further avoiding unnecessary rework.

Although implementations for systems and methods for real-time synchronization of source repositories has been described, it is to be understood that the appended claims are not necessarily limited to the specific features or methods described. Rather, the specific features and methods are disclosed as examples of implementations for real-time synchronization of source repositories.

The invention claimed is:

1. A system for real-time synchronization of source repositories, the system comprises:
a memory;
a processor coupled to the memory, wherein the processor is configured to execute programmed instructions stored in the memory for:
receiving a set of documents, wherein the set of documents correspond to history of changes and changed data associated with a source repository since last replication of the source repository over an intermediate storage, wherein the source repository is selected from a set of repositories, and wherein the history of changes correspond to timelines associated with one or more changes in the source repository;
converting the set of documents in an intermediate format to generate a set of intermediate documents, wherein the set of intermediate documents are stored in the intermediate storage, wherein the set of intermediate documents are compatible with a set of repositories, and wherein the set of intermediate documents are used to update the target repository in real-time based on the set of intermediate documents;
identifying one or more target repositories from the set of repositories based on analysis of the set of intermediate documents and current status associated with each repository from set of repositories; and
transmitting the set of intermediate documents to the one or more target repositories, wherein each target repository is configured to convert the set of intermediate documents into a format compatible with the target repository and update the target repository based on the set of intermediate documents.

2. The system of claim 1, wherein each repository, from the set of repositories, is configured to maintain source code corresponding to a software under development.

3. The system of claim 1, wherein the source repository is accessible through a software development platform.

4. The system of claim 3, wherein the software development platform enables a user to change the data stored in the source repository.

5. A method for real-time synchronization of source repositories, the method comprising steps of:
receiving, by a processor, a set of documents, wherein the set of documents correspond to history of changes and changed data associated with a source repository since last replication of the source repository over an intermediate storage, wherein the source repository is selected from a set of repositories, and wherein the history of changes correspond to timelines associated with one or more changes in the source repository;
converting, by the processor, the set of documents in an intermediate format to generate a set of intermediate documents, wherein the set of intermediate documents are stored in the intermediate storage, wherein the set of intermediate documents are compatible with a set of repositories, and wherein the set of intermediate documents are used to update the target repository in real-time based on the set of intermediate documents;
identifying, by the processor, one or more target repositories from the set of repositories based on analysis of the set of intermediate documents and current status associated with each repository from set of repositories; and transmitting, by the processor, the set of intermediate documents to the one or more target repositories, wherein each target repository is configured to convert the set of intermediate documents into a format compatible with the target repository and update the target repository based on the set of intermediate documents.

6. The method of claim 5, wherein each repository, from the set of repositories, is configured to maintain source code corresponding to a software under development.

7. The method of claim 5, wherein the source repository is accessible through a software development platform.

8. The method of claim 7, wherein the software development platform enables a user to change the data stored in the source repository.

9. A computer program product having embodied thereon a computer program executable in a computing device for real-time synchronization of source repositories, the computer program product comprises:

a program code for receiving a set of documents, wherein the set of documents correspond to history of changes and changed data associated with a source repository since last replication of the source repository over an intermediate storage, wherein the source repository is selected from a set of repositories, and wherein the history of changes correspond to timelines associated with one or more changes in the source repository;

a program code for converting the set of documents in an intermediate format to generate a set of intermediate documents, wherein the set of intermediate documents are stored in the intermediate storage, wherein the set of intermediate documents are compatible with a set of repositories; and wherein the set of intermediate documents are used to update the target repository in real-time based on the set of intermediate documents;

a program code for identifying one or more target repositories from the set of repositories based on analysis of the set of intermediate documents and current status associated with each repository from set of repositories; and a program code for transmitting the set of intermediate documents to the one or more target repositories, wherein each target repository is configured to convert the set of intermediate documents into a format compatible with the target repository and update the target repository based on the set of intermediate documents.

* * * * *